US007542460B2

(12) United States Patent  
Kuwabara et al.

(10) Patent No.: US 7,542,460 B2  
(45) Date of Patent: Jun. 2, 2009

(54) IP PHONE DEVICE CAPABLE OF REMOTE CONTROLLING ASSOCIATED PC WITH CONTROL COMMAND IN AUDIO SIGNAL FORMAT

(75) Inventors: Kazuhiro Kuwabara, Handa (JP); Susumu Chida, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1111 days.

(21) Appl. No.: 10/673,500

(22) Filed: Sep. 30, 2003

(65) Prior Publication Data

US 2005/0099997 A1  May 12, 2005

(30) Foreign Application Priority Data

Sep. 30, 2002 (JP) ............................. 2002-285184

(51) Int. Cl.  
*H04L 12/66* (2006.01)

(52) U.S. Cl. ....................... 370/352; 370/353; 370/354; 370/355; 370/356

(58) Field of Classification Search ................. 370/352, 370/353, 354, 355, 356  
See application file for complete search history.

(56) References Cited

U.S. PATENT DOCUMENTS 7,023,987 B1*  4/2006  Prentice ................. 379/413.03  
7,061,901 B1*  6/2006  Shnitzer et al. ............. 370/352

FOREIGN PATENT DOCUMENTS

| JP | A 2001-86209 | 3/2001 |
| JP | A 2001-217929 | 8/2001 |
| JP | A 2001-230879 | 8/2001 |

* cited by examiner

*Primary Examiner*—Quynh H Nguyen  
(74) *Attorney, Agent, or Firm*—Oliff & Berridge, PLC

(57) ABSTRACT

To facilitate calls made by Internet telephony through a computer, an IP phone system is provided with an audio I/F 18 for inputting and outputting audio signals for communications to and from a PC 20 over the Internet 200, in accordance with Internet telephony execution commands; a user I/F 13 for inputting Internet telephony call start instructions; and a path switching portion 19 for switching the output destination of audio signals that are input though a handset 14 and the input source of audio signals to be output as sounds from the handset 14, between an NCU 17 and the audio I/F 18, if a call start instruction for Internet telephony is input. If a call start instruction for Internet telephony is input from the user I/F 13, a control portion 11 outputs a control command for executing Internet telephony with respect to the PC 20, as an audio signal from the audio I/F 18.

12 Claims, 4 Drawing Sheets

IP PHONE DEVICE CAPABLE OF REMOTE CONTROLLING ASSOCIATED PC WITH CONTROL COMMAND IN AUDIO SIGNAL FORMAT

BACKGROUND OF THE INVENTION

1. Field of the Invention

The present invention relates to an IP phone device, an IP phone system, and a computer program that enable calls by Internet telephony through a computer provided with an Internet telephony function.

2. Description of the Related Art

It is known in the art to install software for Internet telephony into a personal computer, to enable the use of Internet telephony, as disclosed in Japanese Patent Application Publication No. 2001-86209. However, it is usual in such a prior art device to utilize a dedicated headset, i.e., a device that integrates headphones or earphones and a microphone, as the transmitter/receiver.

Since this type of transmitter/receiver is a dedicated device for utilizing the Internet call function, however, it cannot be used for other applications when not being used for the Internet call function. If it were possible in such a case to appropriate a device that is used for other applications as a device for utilizing the Internet call function, this would be ideal because there would be no need to provide a dedicated device that can only be used for Internet telephony.

In this context, the present inventors have proposed an IP phone device that makes it possible to employ a known type of phone terminal that can implement voice calls by inputting and outputting sounds from a transmitter/receiver. In this IP phone device, the configuration is such that audio signals are exchanged between a conventional phone terminal and a personal computer through a cable. However, when the subscriber wants to perform a remote operation for the personal computer from the phone terminal side, it is necessary to send a control signal for launching software such as that for Internet telephony. Such control signals necessitate new equipment such as a dedicated cable and pins, making the connection troublesome and also expensive.

SUMMARY OF THE INVENTION

The present invention has been made in the light of the above problem, and accordingly it is an object of the present invention to provide an IP phone device, an IP phone system, and a computer program that are inexpensive and also enable a simple connection between a conventional phone terminal and a personal computer, without having to provide equipment such as a dedicated cable and pins for transmitting and receiving control signals between the phone terminal and the personal computer.

To achieve the above and other objects, there is provided an IP phone device that includes an NCU connected to a phone network, a handset that is used for making phone calls with a remote phone device through the NCU and the phone network while exchanging audio signals; an audio interface; call-start instruction input means; path switching means; and computer control means. The audio interface is responsive to an Internet telephony execution instruction and inputs and outputs the audio signals for the phone calls to and from a remote IP phone device through Internet via the computer. The call-start instruction input means is provided for inputting a call-start instruction for Internet telephony in accordance with user's actions. The path switching means is provided for switching a path from the NCU to the audio interface to output an audio signal input through the handset and to input an audio signal output from the handset through the audio interface when the call-start instruction for Internet telephony is input from the call-start instruction input means. The computer control means is provided for outputting control commands to a computer for executing Internet telephony to the computer from the audio interface when the call-start instruction for Internet telephony is input from the call-start instruction input means. The control commands are output in the form of an audio signal. The computer executes transmission/reception of the audio signals to and from the remote IP phone device.

According to another aspect of the invention, there is provided a storage medium that stores an Internet telephony program for installing into a computer. The Internet telephony program includes a program for implementing communication processing entailed by an Internet telephony in accordance with control commands in the form of a DTMF signal received from an IP phone device connected to the computer.

DETAILED DESCRIPTION OF THE PREFERRED EMBODIMENT

An IP phone according to the preferred embodiment of the invention will be described with reference to the accompanying drawings.

Figure 1:
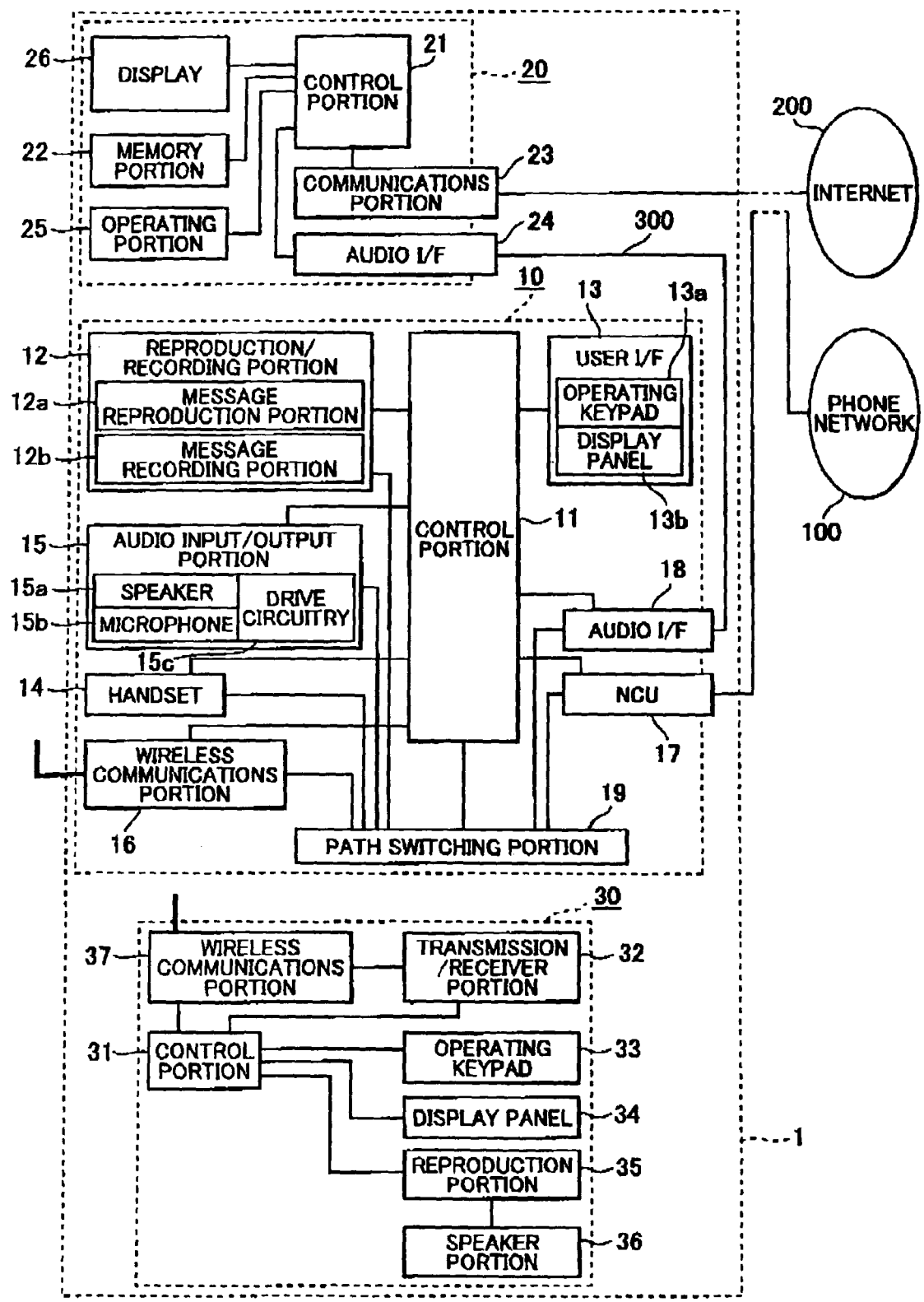
FIG. 1 is a block diagram illustrating an IP phone system in accordance with the present invention.

A block diagram that illustrates an IP phone system in accordance with the present invention is shown in FIG. 1. An IP phone system 1 has an IP phone device 10 that has the function of enabling voice calls, based on audio signals transferred through a phone network 100, and a personal computer (hereinafter abbreviated to "PC") 20 that is capable of communicating data over the Internet 200. The IP phone device 10 and the PC 20 are connected together by an audio cable 300 that is capable of carrying audio data.

The IP phone device 10 is provided with components such as a control portion 11 that controls the operations of the entire system, a reproduction/recording portion 12 that reproduces sounds based on audio signals and records audio signals, a user interface portion (hereinafter abbreviated to "user I/F") 13, a handset 14 that is a transmitter/receiver used by removing from the main unit of the IP phone device 10, an audio input-output portion 15 that inputs and outputs sounds, a wireless communications portion 16 for wireless communications, a network control unit (NCU) 17 that inputs and outputs audio signals transmitted through the phone network 100, an audio signal interface portion (hereinafter abbreviated to "audio I/F") 18 that inputs and outputs audio signals transmitted through the audio cable 300, a path switching portion 19 that switches the transmission paths of audio signals within the IP phone device 10, and a sub-terminal 30 for wireless communication that enable communication to and from the main IP phone device 10 (the wireless communications portion 16 thereof).

Of these components, the reproduction/recording portion 12 includes a message reproduction portion 12a that reproduces sounds based on previously recorded audio signals and a message recording portion 12b that records messages as audio data when the device is acting as an answerphone. Recorded within the message reproduction portion 12a are audio signals such as a ringing sound used when an incoming call is received, a hold sound used when a voice call is put on hold, and a recorded answerphone message indicating when to start recording a message with the answerphone function.

The user I/F 13 includes an operating keypad 13a, which is configured of a plurality of keys, and a display panel 13b that displays various items of information. The operating keypad 13a has various keys such as a plurality of numeric keys, a hold key for starting and stopping the holding of a voice call, a switching key for switching the transmission path used for the input and output of external audio signals between the NCU 17 and the audio I/F 18, an external-line key for starting a voice call, and a cutoff key for ending a voice call.

The audio input-output portion 15 includes a speaker 15a, a microphone 15b, and drive circuitry 15c for driving those components. In addition to outputting sounds from the speaker 15a, the speaker 15a and the microphone 15b can be used as receiver/transmitter to implement hands-free voice calls.

The wireless communications portion 16 implements wireless calls by transmitting and receiving various signals, including audio signals, to and from the sub-terminal 30. The path switching portion 19 receives instructions from the control portion 11 to switch the transmission path used for inputting or outputting an audio signal from or to the exterior of the IP phone device 10, between the NCU 17 and the audio I/P 18. Note that this transmission path is switched to the NCU 17 in the initial state.

When an operation for starting a call (hereinafter referred to as "off-hook operation") is performed by a component that functions as a transmitter/receiver, the path switching portion 19 sets the transmission source of an audio signal that is Input from the exterior and the transmission destination of an audio signal that is output to the exterior. The transmitter/receiver is any of the handset 14, the audio input-output portion 15, and the sub-terminal 30 (the wireless communications portion 16); hereinafter referred collectively to as "transmitter/receiver group". Specifically, if the handset 14 has been removed from the main unit of the IP phone device 10, the transmission source and the transmission destination are set to the handset 14. If the external-line key of the operating keypad 13a of the user I/F 13 has been pressed, the transmission source and the transmission destination are set to the audio Input-output portion 15.

If an operation for starting a call by the sub-terminal 30 has been done by pressing the external-line key that is part of the operating keypad 33, as will be described later, the transmission source and the transmission destination are set to the wireless communications portion 16. If an operation for ending a call is done by one of the transmitter/receiver group (hereinafter this operation will be referred to as "on-hook operation"), the system releases the transmission destination and transmission source of audio signals that have been set for the transmitter/receiver group. More specifically, the transmission destination and transmission source of the audio signals are released if the handset 14 has been returned to the IP phone device 10 itself, or if the cut-off key of the operating keypad 13a of the user I/F 13 has been pressed, or if an operation to end a call has been performed by the sub-terminal 30.

The sub-terminal 30 is provided with components such as a control portion 31 that controls the operations of the entire sub-terminal 30; a transmitter/receiver portion 32 including a speaker, a microphone, and drive circuitry for driving the latter two components; an operating keypad 33 configured of a plurality of keys; a display panel 34 that displays various items of information; a reproduction portion 35 that reproduces sounds based on various previously-recorded audio signals; a speaker portion 36 that outputs sounds that have been reproduced by the reproduction portion 35, using the drive circuitry that drives the speaker and microphone; and a wireless communications portion 37 that transmits and receives various signals, including audio signals, by wireless signaling to and from the IP phone device 10 itself (the wireless communications portion 16 thereof). The operating keypad 33 provided for the sub-terminal 30 has keys such as a plurality of numeric keys, an external-line key for starting a voice call, a cutoff key for ending a voice call, and a hold key for starting and stopping the holding of a voice call. Recorded within the reproduction portion 35 are audio signals such as those for a call sound used when an incoming call is received and a hold sound used when a voice call is put on hold.

The PC 20 is provided with components such as a control portion 21 that controls the operations of the entire PC 20, a memory portion 22 that holds various items of information, a communications portion 23 for connecting the PC 20 to the Internet 200, an audio signal Interface portion (hereinafter abbreviated to audio I/F) 24 that inputs and outputs audio signals through the audio cable 300, an operating portion 25 including a keyboard and mouse or the like, and a display 26.

This PC 20 has the function of implementing voice calls that are based on audio data transmitted over the Internet 200 (hereinafter referred to as "Internet call function"). This Internet call function implements the call-start processing, transmission/reception processing, and call-end processing that are described below, in accordance with a procedure specified by application software that is loaded into the memory portion 22 (hereinafter referred to as "communications software").

The call-start processing is a routine for starting data communications with another PC that is loaded with the same communications software, amongst other PCs that are capable of data communications over the Internet 200. The call-start processing establishes a logical communication path with that PC. This call-start processing is implemented when an operation is performed by the operating portion 25 to specify the other party's PC, while the communications software is in an active state. The communications software is configured to execute this call-start processing then continue to output a notification signal, which is a control signal for notifying that the voice call has started, to the IP phone device 10 through the audio I/F 24 and the audio cable 300, from the time of the start of the voice call until the end of the voice call.

The transmission/reception processing generates data in packet units, based on audio signals, and sends that data through the communications portion 23 and the Internet 200 to the PC that is establishing the connection. It also generates audio signals, based on data in packet units that has been received through the Internet 200 and the communications portion 23 from the PC that is establishing the connection. During actual operation, it ensures that data is generated in packet units, based on audio signals that are input through the audio cable 300 and the audio I/F 24 from the IP phone device 10, and ensures that the data is output to the Internet 200. The audio signals that are generated from the data in packet units is output to the IP phone device 10 through the audio I/F 24 and the audio cable 300. This transmission/reception processing is a routine that is executed repeatedly until the call-end processing is executed, after the call-start processing has been executed. This implements a voice call to and from another PC that is connected by the Internet 200 to the PC 20 (to the IP phone device 10 connected thereto).

The call-end processing is a routine that ends the use of the Internet call function by releasing the connection of the PC that is establishing the connection (cutting the logical communication path). This call-end processing is executed when an operation that specifies another PC as the call-partner is done by the operating portion 25 or when an operation for ending the communications software is performed. Note that the communications software is configured to send a release signal for notifying the release of the connection from the PC in which that communications software is installed to the PC that is establishing the connection, when the operation has been performed to end the communications software itself. When the PC 20 receives that release signal, it too performs call-end processing.

Although detailed description is omitted, it should be noted the partial section of the communication path that extends from the communications portion 23 of the PC 20 to the Internet 200 (the section from the user's side to the telephone company side) is used in common by the phone line that connects the section between the NCU 17 of the IP phone device 10 and the phone network 100. Within this section, audio signals sent through the phone network 100 and data sent over the Internet 200 are sent in a multiplexed state, by asymmetric digital subscriber line (ADSL) technology.

Figure 2:
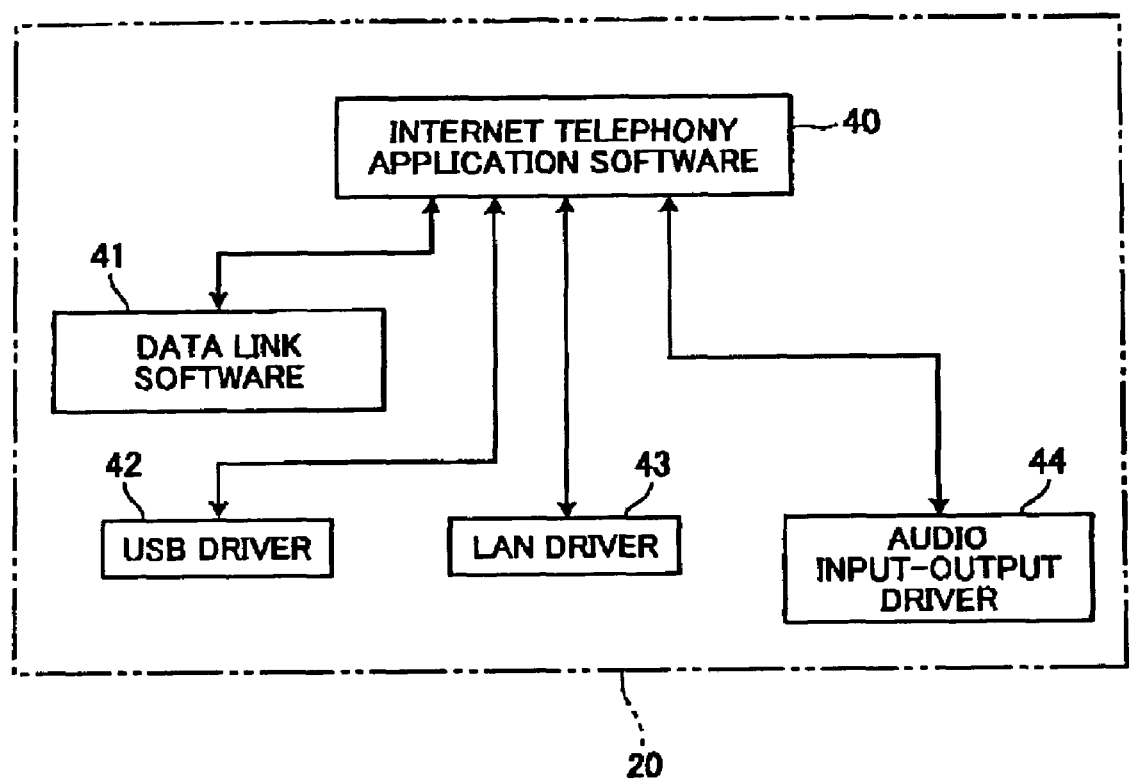
FIG. 2 is a schematic view of the configuration of Internet-telephony related software in a PC.

An explanatory diagram of the configuration of Internet-telephony related software in the PC 20 is shown in FIG. 2. As can be seen from this figure, software such as Internet telephony application software 40, data link software 41, a USB driver 42, a LAN driver 43, and an audio input-output driver 44 are installed in the PC 20 as software for implementing the Internet telephony function. Of these, the data link software 41, the LAN driver 43, and the audio input-output driver 44, but not the Internet telephony application software 40, are launched as the PC 20 starts up, so these can be used at any time. The Internet telephony application software 40, on the other hand, is not usually launched automatically by the start-up of the PC 20 alone; the user must launch it manually.

The Internet telephony application software 40 controls the call processing entailed by the IP phone call, such as ringing the Internet phone of the call partner over the Internet 200 and receiving a call from a caller by Internet telephony over the Internet 200. The data link software 41 mediates the exchange of commands and audio signals between the Internet telephony application software 40 and the IP phone device 10. Within this data link software 41 is a function that controls the Internet telephony application software 40 through the application program interface (API). The LAN driver 43 mediates the exchange of data between the Internet telephony application software 40 and the Internet 200 through the communications portion 23. The audio input-output driver 44 mediates the exchange of DTMF signals and audio signals between the Internet telephony application software 40 and the path switching portion 19 through the audio I/F 24.

The above-mentioned NCU 17 of the IP phone device 10 serves as phone line connection means for connecting to the phone network. The audio I/F 18 provides audio input-output pins for inputting and outputting audio signals for calls to and from the computer, over the Internet, in accordance with Internet telephony execution instructions that are input from the exterior. The user I/F 13 serves as call-start instruction input means for inputting call-start instructions for Internet telephony, in accordance with the user's actions. The path switching portion 19 serves as audio signal path switching means that switches the output destination of an audio signal that is input through the transmitter/receiver and the input destination of an audio signal that is output as sound from the transmitter/receiver from the phone line connection means to the above-mentioned audio signal input-output pins, if a call-start instruction for Internet telephony is input from the call-start instruction input means. The control portion 11 serves as computer control means that outputs control commands for executing Internet telephony for the computer from the audio signal input-output pins, as audio signals, if a call-start instruction for Internet telephony is input from the call-start instruction input means. It also ensures that audio signals are transferred to and from the terminal that is connected over the Internet to that computer.

The wireless communications portion 16 serves as telephone connection means for connecting the phone to the exterior. The audio cable 300 serves as computer connection means for connecting the IP phone device to a computer that is connected to the Internet. The Internet telephony application software 40 and the data link software 41 of the PC 20 are computer programs that are installed in the computer as programs for Internet telephony, for controlling the call processing that is entailed by the Internet telephony. They ensure that the call processing entailed by the Internet telephony runs on the computer in response to control signals, by DTMF signals from the IP phone device connected to the computer.

Figure 3:
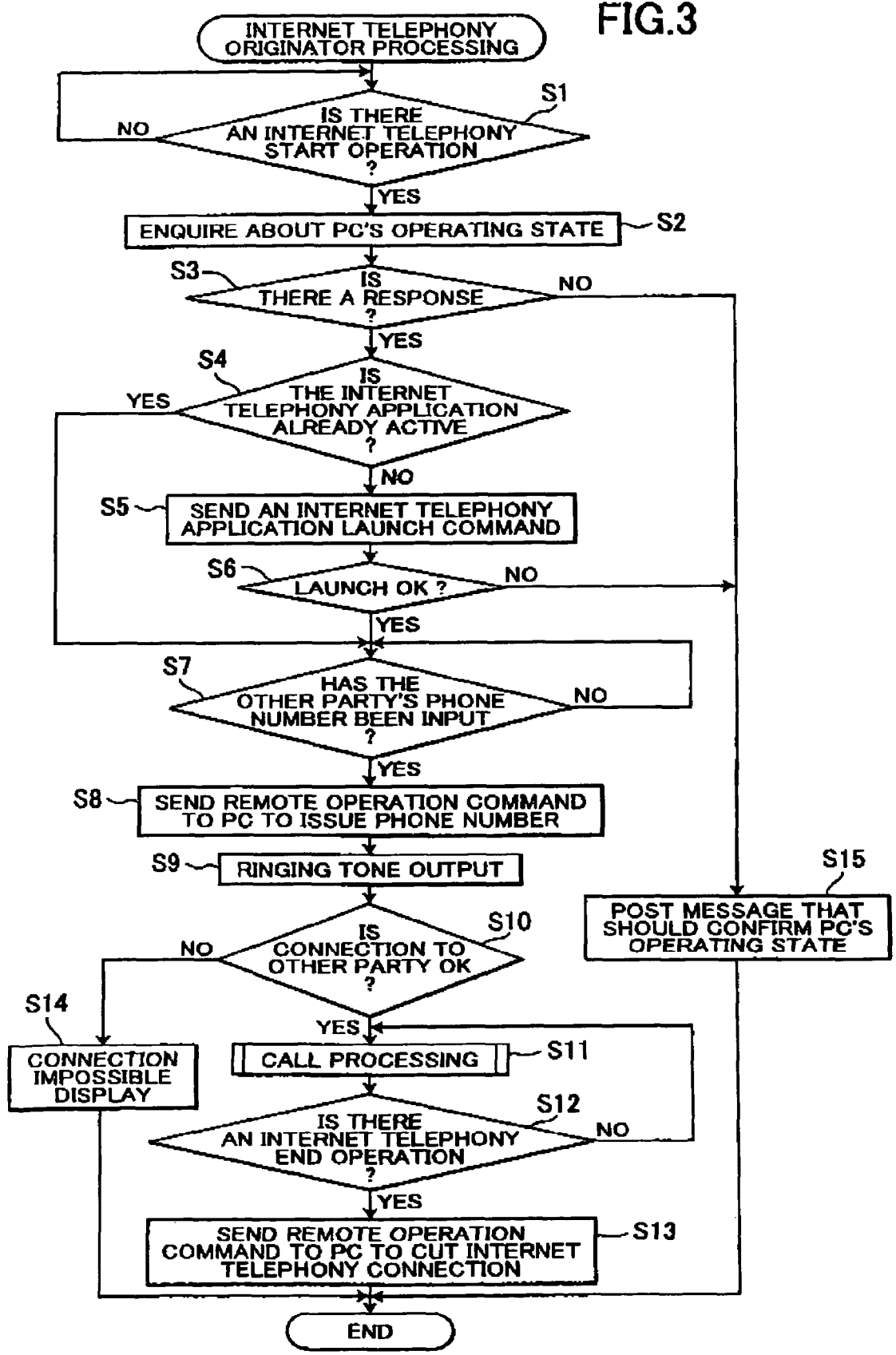
FIG. 3 is a flowchart of the processing procedure of an IP phone device when an Internet telephony call is made.

Operations of the above-described system will be described with reference to the accompanying drawings. A flowchart of the processing procedure of the IP phone device 10 when an Internet telephony call is made (when calling the remote IP phone) is shown in FIG. 3. Note that the procedure for initiating an Internet call from the sub-terminal 30 is similar to that shown in FIG. 3.

First of all, if an operation for starting the Internet call is performed (YES at step S1), the control portion 11 of the IP phone device 10 sends a command to enquire about the operating state of the PC 20 (step S2). One example of the operation for starting an Internet call is holding down the "5" key for at least a second. At this point, a command is sent from the audio I/F 18 to the PC 20 through the audio cable 300 in the form of a DTMF signal.

If the PC 20 responds to the sending of this signal (YES at step S3), the control portion 11 enquires of the PC 20 again as to whether or not the Internet telephony application software 40 is already active (step S4). During this time, the PC 20 receives each command in the form of a DTMF signal through the audio I/F 24, and converts that command into instruction language in internal representational format, to analyze the contents thereof.

If the Internet telephony application software 40 is not active on the PC 20 (NO at step S4), the control portion 11 sends a launch command for launching the Internet telephony application software 40 to the PC 20 (step S5). This launch command is also sent in the form of a DTMF signal from the audio I/F 18 to the PC 20 through the audio cable 300. The PC 20 receives the launch command through the audio I/F 24, and ensures that the data link software 41 automatically starts the Internet telephony application software 40 through the API.

Subsequently, if there is a response from the PC 20 indicating that the launch of the Internet telephony application software 40 succeeded (YES at step S6), the control portion 11 determines whether or not the called party's telephone number has been entered (step S7). Note that the indication of the successful launch of the Internet telephony application software 40 could be posted by a sound or a display.

If the called party's telephone number has been entered (YES at step S7), the control portion 11 transfers the called party's telephone number to the PC 20 and also sends the PC 20 a remote operation command. The remote operation command causes the Internet telephony application software to send out the called party's telephone number (step S8). The called party's telephone number and the remote operation command are also sent from the audio I/F 18 to the PC 20 through the audio cable 300 in the form of DTMF signals. The PC 20 receives the called party's telephone number and the remote operation command from the audio I/F 24, and ensures that the Internet telephony application software 40 performs the corresponding call processing for the Internet call. Note that the called party's telephone number need not necessarily be entered after the launch of the Internet telephony application software 40 but could be entered immediately after the operation of starting the Internet call. It is also possible to implement it by dialing from a phone book or by speed dialing.

After that, the control portion 11 ensures that a fake ringing tone, which has been generated internally, is output from the internal speaker of the handset 14 (step S9).

When a response comes from the PC 20 that the connection to the called party has been established (YES in S10), the control portion 11 stops the output of the ringing tone and proceeds to the call processing (step S11). This call processing enables the exchange of audio signals between the handset 14 and the PC 20, through other components such as the path switching portion 19. In other words, the handset 14 is put into a state such that it is connected directly to the audio I/F 24 of the PC 20, enabling a call by Internet telephony through this handset 14.

Subsequently, if an operation for ending the Internet call is performed (YES at step S12), the control portion 11 sends the PC 20 a remote operation command for cutting the Internet phone connection in the Internet telephony application software 40 (step S13), ending that Internet telephony originator processing. In addition to simply returning the handset 14 to its original location to activate the on-hook state, the operation for ending the Internet call could necessitate the pressing of a predetermined key. In such a case, the remote operation command in the form of a DTMF signal is sent from the audio I/F 18 to the PC 20 through the audio cable 300. The PC 20 receives the remote operation command through the audio I/F 24, then ensures that the Internet telephony application software 40 performs call processing for cutting the Internet telephony connection accordingly. If the operation for ending the Internet call is not performed at step S12, the control portion 11 returns to step S11 to continue the call processing.

If there is no response in step S10 from the PC 20 indicating that the connection to the called party has not been established (NO at step S10), the control portion 11 ensures that the display panel 13b displays "Connection impossible" (step S14) then it ends the Internet telephony originator processing. Note that if connection is not possible, a sound indicating that fact could be output from the internal speaker of the handset 14.

If the called party's phone number has not been entered at step S7 (NO at step S7), the control portion 11 waits until that phone number has been entered. Note that if the called party's phone number has not been entered when a predetermined time has elapsed, the configuration could be such that the Internet telephony originator processing ends and the system returns to a standby state.

If there is a response from the PC 20 at step S6 indicating that the launching of the Internet telephony application software 40 has failed (NO at step S6), the control portion 11 ensures that a message that should confirm the operating state of the PC 20 is output from the internal speaker of the handset 14 (step S15), then the Internet telephony originator processing ends. This makes it possible to reliably inform the user that there is a problem at the PC 20 if the Internet telephony application software 40 has not been launched normally because of a system error or the like at the PC 20. The Internet call can be attempted again after the system error of the PC 20 has been resolved. It should be obvious to those skilled in the art that the message that should confirm the operating state of the PC 20 could be displayed as words on the display panel 13b.

If it is determined at step S4 that the Internet telephony application software 40 is already active (YES at step S4), the control portion 11 jumps to step S7 without sending a launch command for the Internet telephony application software 40 to the PC 20.

If there is no response from the PC 20 at step S3 in reply to the enquiry about the operating state (NO at step S3), the control portion 11 first determines whether or not the PC 20 has been activated by turning it on, and jumps to step S15. This makes it possible to inform the user reliably that the PC 20 itself is not operating, enabling the user to make the Internet call after starting up the PC 20.

If there is no operation for starting an Internet call at step S1 (NO at step S1), the control portion 11 continues in the standby state until an Internet call start operation does occur.

Figure 4:
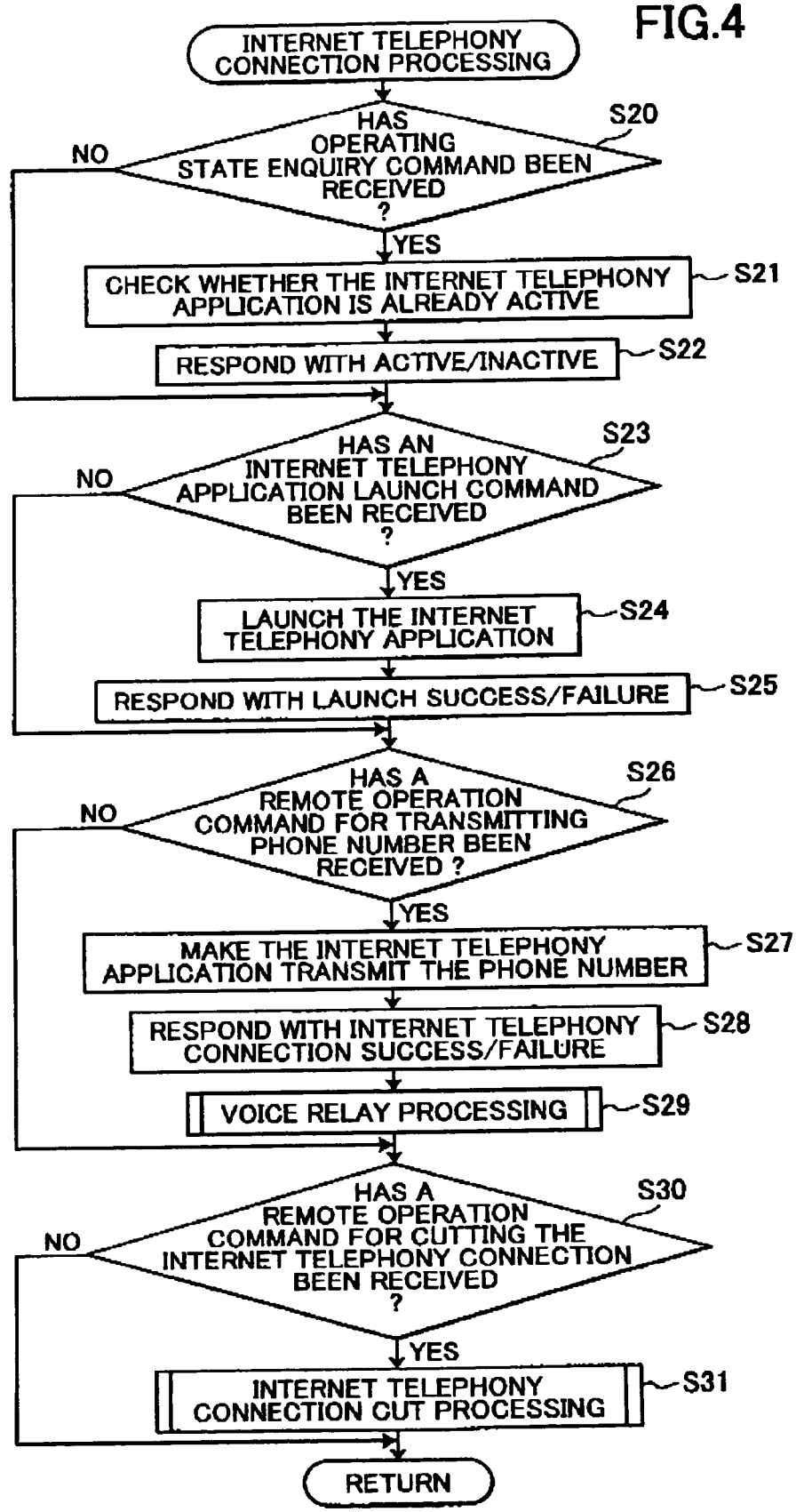
FIG. 4 is a flowchart of the processing procedure during connection of the PC to the Internet phone in response to a request from the IP phone device.

A flowchart of the processing procedure during connection of the PC 20 to the Internet phone in response to a request from the IP phone device 10 is shown in FIG. 4. Note that the procedure of the PC 20 for initiating an Internet call from the sub-terminal 30 through the IP phone device 10 is similar to that shown in FIG. 4.

The data link software 41 running on the PC 20 monitors whether or not there is a command for enquiring about the operating state from the IP phone device 10 (step S20). If such a command is received (YES at step S20), the data link software 41 checks whether the Internet telephony application software 40 is already active or is in an inactive state (step S21). The data link software 41 responds to the IP phone device 10, either stating that the Internet telephony application software 40 is active or that it is inactive (step S22).

The data link software 41 also monitors whether or not there is a launch command from the IP phone device 10 for launching the Internet telephony application software 40 (step S23). If a launch command is received (YES at step S23), the data link software 41 ensures that the Internet telephony application software 40 launches automatically through the API (step S24). The data link software 41 then responds to the IP phone device 10 indicating that the Internet telephony application software 40 was launched successfully or failed to launch (step S25).

In additions the data link software 41 notifies the called party's phone number that has been entered from the IP phone device 10 to the Internet telephony application software 40 and also monitors whether or not there is a remote operation command for the Internet telephony application software 40 to transmit that phone number (step S26).

If a remote operation command for transmitting the called party's phone number has been received (YES at step S26), the data link software 41 instructs the Internet telephony application software 40 to send out the called party's phone number that has been sent from the IP phone device 10 (step S27).

In accordance with the issue of the called party's phone number, the data link software 41 also responds to the IP phone device 10 concerning whether or not the connection by Internet telephony to the called party over the Internet 200 has succeeded or failed (step S28).

If the connection by Internet telephony has succeeded, the data link software 41 executes voice relay processing (step S29). This voice relay processing enables voice communication between the calling and called parties over the Internet 200 using the handset 14 of the IP phone device 10, through the Internet telephony application software 40, thus enabling the call by Internet telephony. Subsequently, the data link software 41 monitors whether or not there is a remote operation command from the IP phone device 10 for cutting the Internet telephony connection (step S30).

If a remote operation command for cutting the Internet telephony connection is received (YES at step S30), the data link software 41 ensures that the Internet telephony application software 40 cuts the Internet telephony connection (step S31), to end this Internet telephony connection processing. If there is no remote operation command for cutting the Internet telephony connection from the IP phone device 10 at step S30 (NO at step S30), the data link software 41 returns to step S20 and periodically repeats the Internet telephony connection processing.

If there is no remote operation command for transmitting the called party's phone number at step S26 (NO at step S26), the data link software 41 jumps to step S30. If there is no launch command at step S23 (NO at step S23), the data link software 41 jumps to step S26. If there is no command for enquiring about the operating state at step S20 (NO at step S20), the data link software 41 jumps to step S23.

Thus, if the Internet telephony application software 40 on the PC 20 has not been launched already when an attempt is made to place an Internet call from the IP phone device 10, this embodiment ensures that the Internet telephony application software 40 is launched automatically in answer to a launch command from the IP phone device 10. This ensures that the user does not have to operate the PC 20 directly to explicitly confirm that the software has been launched and is active, making it possible to facilitate Internet calls through the PC 20.

Since it is also not necessary for the user to operate the PC 20 directly to perform operations explicitly on the PC 20 in order to input the called party's phone number or start and end the Internet call, even after the Internet telephony application software 40 has been launched automatically, this further facilitates the use of Internet telephony.

Of course, since remote control of the Internet telephony application software 40 on the PC 20 is possible through the IP phone device 10, it is possible to obtain the same effects as those previously described even when the sub-terminal 30 is used to make an Internet call. In particular, use of the sub-terminal 30 makes it possible to place an Internet call by simply operating the sub-terminal 30 from a location that is some distance from the place In which the PC 20 is installed.

Although the present invention has been described with respect to a specific embodiment, it will be appreciated by one skilled in the art that a variety of changes and modifications may be made without departing from the scope of the invention. For example, it is possible to specify that the specific key such as the "#" key must be pressed before the input of the called party's phone number, when making an Internet call.

The operation for starting the Internet call at step S1 of FIG. 4 could be simply placing the handset 14 in the off-hook state. It should be obvious that the state in which an off-hook signal has been received from the sub-terminal 30 is similar to that for starting the Internet call.

What is claimed is:

1. An IP phone device comprising:
an NCU connected to a phone network;
a handset that is used for making phone calls with a remote phone device through the NCU and the phone network while exchanging audio signals;
an audio interface responsive to an Internet telephony execution instruction, for inputting and outputting the audio signals for the phone calls to and from a remote IP phone device through Internet via a computer;
call-start instruction input means for inputting a call-start instruction for Internet telephony in accordance with user's actions;
path switching means for switching a path from the NCU to the audio interface to output an audio signal input through the handset and to input an audio signal output from the handset through the audio interface when the call-start instruction for Internet telephony is input from the call-start instruction input means; and
computer control means for launching Internet telephony application software and outputting control commands to a computer for executing Internet telephony to the computer from the audio interface when the call-start instruction for Internet telephony is input from the call-start instruction input means, the control commands being output in the form of an audio signal, the computer executing transmission/reception of the audio signals to and from the remote IP phone device;
the computer control means further outputting a first command in the form of an audio signal to the computer to check if the Internet telephony application software has been launched, the computer control means outputting a second command in the form of an audio signal to the computer to launch the Internet telephony application software unless the Internet telephony application software has been launched.

2. The IP phone device according to claim 1, wherein the computer control means outputs the control commands in the form of a DTMF signal to the computer.

3. The IP phone device according to claim 1, further comprising phone device connection means for connecting a sub-phone device for allowing the sub-phone device to make phone calls with the remote IP phone device, the computer control means receiving the control commands from the sub-phone device through the phone device connection means and transmitting the control commands to the computer in the form of a DTMF signal.

4. The IP phone device according to claim 1, further comprising computer connection means for connecting to the computer connected to the Internet to allow the audio signals and other signals to input from and output to the computer through the computer connection means.

5. The IP phone device according to claim 1, wherein the computer is connected through an audio cable.

6. An IP phone system comprising:
a computer connectable to Internet; and
an IP phone comprising:
    an NCU connected to a phone network;
    a handset that is used for making phone calls with a remote phone device through the NCU and the phone network while exchanging audio signals;
    an audio interface responsive to an Internet telephony execution instruction, for inputting and outputting the audio signals for the phone calls to and from a remote IP phone device through Internet via the computer;

call-start instruction input means for inputting a call-start instruction for Internet telephony in accordance with user's actions;

path switching means for switching a path from the NCU to the audio interface to output an audio signal input through the handset and to input an audio signal output from the handset through the audio interface when the call-start instruction for Internet telephony is input from the call-start instruction input means; and computer control means for launching Internet telephony application software and outputting control commands to the computer for executing Internet telephony to the computer from the audio interface when the call-start instruction for Internet telephony is input from the call-start instruction input means, the control commands being output in the form of an audio signal, the computer executing transmission/reception of the audio signals to and from the remote IP phone device;

the computer control means further outputting a first command in the form of an audio signal to the computer to check if the Internet telephony application software has been launched, the computer control means outputting a second command in the form of an audio signal to the computer to launch the Internet telephony application software unless the Internet telephony application software has been launched.

7. The IP phone system according to claim 6, wherein the computer control means outputs the control commands in the form of a DTMF signal to the computer.

8. The IP phone system according to claim 6, further comprising phone device connection means for connecting a sub-phone device for allowing the sub-phone device to make phone calls with the remote IP phone device, the computer control means receiving the control commands from the sub-phone device through the phone device connection means and transmitting the control commands to the computer in the form of a DTMF signal.

9. The IP phone system according to claim 6, further comprising computer connection means for connecting to the computer connected to the Internet to allow the audio signals and other signals to input from and output to the computer through the computer connection means.

10. The IP phone system according to claim 6, wherein the computer is connected through an audio cable.

11. The IP phone device according to claim 1, wherein the computer control means further outputs a message that informs a user that launching the Internet telephony application software has failed.

12. The IP phone system according to claim 6, wherein the computer control means further outputs a message that informs a user that launching the Internet telephony application software has failed.

\* \* \* \* \*